United States Patent [19]

Tanaka

[11] Patent Number: 5,414,563
[45] Date of Patent: May 9, 1995

[54] ELECTROMAGNETIC OBJECTIVE LENS DRIVING APPARATUS OF OPTICAL DATA RECORDING AND REPRODUCING APPARATUS

[75] Inventor: Akihiro Tanaka, Tokyo, Japan

[73] Assignee: Asahi Kogaku Kogyo Kabushiki Kaisha, Tokyo, Japan

[21] Appl. No.: 98,070

[22] Filed: Jul. 28, 1993

[30] Foreign Application Priority Data

Jul. 28, 1992 [JP] Japan .................. 4-201044
Jul. 28, 1992 [JP] Japan .................. 4-201046

[51] Int. Cl.⁶ .............................................. G02B 7/02
[52] U.S. Cl. ...................... 359/814; 359/824; 369/44.15
[58] Field of Search ............ 369/44.14, 44.15, 44.16, 369/44.17, 44.18, 44.19, 44.21, 44.22; 359/814, 824

[56] References Cited

U.S. PATENT DOCUMENTS

| | | | |
|---|---|---|---|
| 4,592,037 | 5/1986 | Ohnuki | 369/44.15 |
| 4,878,214 | 10/1989 | Hinotani | 369/44.15 |
| 5,018,836 | 5/1991 | Noda et al. | 369/44.16 |
| 5,068,844 | 11/1991 | Tanaka . | |
| 5,072,433 | 12/1991 | Tanaka . | |
| 5,078,471 | 1/1992 | Takishima . | |
| 5,103,345 | 4/1992 | Watanabe et al. . | |
| 5,136,558 | 8/1992 | Getreuer et al. | 369/44.15 |
| 5,191,570 | 3/1993 | Shirai . | |
| 5,222,056 | 6/1993 | Tanaka . | |

FOREIGN PATENT DOCUMENTS

| | | | |
|---|---|---|---|
| 58-218051 | 12/1983 | Japan | 369/44.14 |
| 63-127439 | 5/1988 | Japan | 369/44.15 |
| 63-129535 | 6/1988 | Japan | 369/44.15 |
| 0118547 | 7/1989 | Japan | 369/44.16 |
| 02189730 | 7/1990 | Japan | 369/44.21 |

Primary Examiner—Georgia Y. Epps
Assistant Examiner—P. W. Huber
Attorney, Agent, or Firm—Sandler, Greenblum & Bernstein

[57] ABSTRACT

An electromagnetic objective lens driving apparatus of an optical disc data recording and reproducing apparatus includes a carriage which is movable in a radial direction of an optical disc, and an objective lens holder which supports an objective lens in a manner such that laser beams are converged onto the optical disc. The objective lens holder is supported on the carriage so as to move in the focusing and the tracking directions of the optical disc. The objective lens holder is provided with a cylindrical holder portion which holds the objective lens, and a pair of symmetrical wings that project radially from the cylindrical holder portion in the tracking direction.

21 Claims, 7 Drawing Sheets

ELECTROMAGNETIC OBJECTIVE LENS DRIVING APPARATUS OF OPTICAL DATA RECORDING AND REPRODUCING APPARATUS

BACKGROUND OF THE INVENTION

1. Field of the Invention

The present invention relates to an optical disc data recording and reproducing apparatus which optically reads data from or writes data onto an optical disc. More precisely, it relates to a driving apparatus which electromagnetically drives an objective lens thereof.

2. Description of Related Art

In a known optical disc apparatus, such as an opto-magnetic disc apparatus, an objective lens is held on a carriage which is movable in a radial direction (i.e., tracking direction) of the optical disc. The objective lens is movable, through an elastic member, in the tracking direction and the focusing direction. Tracking and focusing coils are provided on an objective lens holder. An electromagnetic driving circuit made up of a magnetic circuit and the tracking and focusing coils is provided to drive the objective lens in the tracking direction and in the focusing direction. The focusing and tracking coils are supplied with predetermined directions and intensities of electric current to drive the objective lens holder, so that the laser beams can be accurately converged onto the recording track of the optical disc by the objective lens.

In such a known electromagnetic objective lens driving apparatus, the carriage is moved in the radial direction of the optical disc to move the objective lens holder on the carriage. It is necessary to make the carriage and the lens holder as light as possible for fast track access and precise focusing and tracking operations. For instance, in a support mechanism in which the objective lens holder is supported through suspension wires, the lens holder is heavy and unable to accelerate quickly.

SUMMARY OF THE INVENTION

The primary object of the present invention is to reduce the weight of and miniaturize the objective lens holder.

Another object of the present invention is to provide a small and light objective lens holder in which the objective lens holder is supported by suspension wires.

Still another object of the present invention is to provide a thin elastic support of an objective lens holder in which, when the objective lens holder is electromagnetically driven at a high acceleration, no deviation or inclination of the optical axis thereof will occur.

The present invention is also aimed at the provision of a light wiring arrangement in which a suspension wire is employed to supply tracking and focusing coils with electrical power.

To achieve the object mentioned above, according to the present invention, there is provided an electromagnetic objective lens driving apparatus in an optical disc data recording and reproducing apparatus, including a carriage which is movable in a radial direction of the optical disc, and an objective lens holder which supports an objective lens in such a manner that laser beams are converged onto the optical disc. The objective lens holder is supported on the carriage so as to move the focusing and tracking directions of the optical disc. The objective lens holder is provided with a cylindrical holder portion which holds the objective lens, and a pair of symmetrical wings which project radially from the cylindrical holder portion in the tracking direction.

Focusing coils are also provided, and are secured to the respective wings. Tracking coils are secured to diametrically opposed outer surface portions of the cylindrical holder portion perpendicular to the tracking direction.

Preferably, holes are provided on the wings in which the focusing coils are inserted and secured.

This structure provides for a light, movable member, which is driven by the electromagnetic driving circuits on the carriage, thus resulting in precise tracking and focusing operations and fast track access.

Preferably, the carriage includes two pairs of focusing permanent magnets provided on opposite sides of the respective focusing coils secured to the wings of the objective lens holder, and a pair of tracking permanent magnets provided on opposite sides of the tracking coils secured to the outer surface portions of the cylindrical holder portion.

In an embodiment of the present invention, the wings of the objective lens holder are provided on both ends thereof with upper and lower suspension wires connecting holes spaced in the focusing direction, so that the four suspension wires are connected at one end thereof to the suspension wire connecting holes and at the other ends to the supporting block.

According to the inventors' analysis, the deviation or inclination of the optical axis of the objective lens, caused by the torque produced based on the cumulative errors during the electromagnetic driving operation at high acceleration, reduces as the distance between the four suspension wires increases, provided that other mechanical factors of the four suspension wires are identical. The optical data recording and reproducing apparatus should be as thin as possible. To this end, the distance between the suspension wires in the tracking direction is preferably larger than the distance therebetween in the focusing direction.

In the present invention, the wings project from the holder in the tracking direction. Accordingly, the distance "a" between the suspension wires in the tracking direction can be increased without need for additional space.

Preferably, the focusing coils are secured to the respective wings, and the tracking coils are secured to diametrically opposed outer surface portions of the cylindrical holder portion perpendicular to the tracking direction.

The objective lens holder can be formed by plastic injection molding. Preferably, a printed circuit is provided on the objective lens holder to electrically connect the suspension wires connecting holes and the focusing and tracking coils, respectively. The four suspension wires inserted in the corresponding suspension wire connecting holes can be easily soldered to the printed circuit, so that the suspension wires can be used as a power supply line.

According to another aspect of the present invention, an electromagnetic objective lens driving apparatus in an optical disc data recording and reproducing apparatus comprises an objective lens which converges laser beams onto the optical disc, and an objective lens holder which is provided with a cylindrical holder portion which holds the objective lens, and a pair of symmetrical wings which project radially from the cylindrical holder portion in the tracking direction.

A yoke member is provided on the carriage. The carriage can include two pairs of focusing permanent magnets provided on opposite sides of the respective focusing coils secured to the wings of the objective lens holder, and a pair of tracking permanent magnets provided on opposite sides of the tracking coils secured to the outer surface portions of the cylindrical holder portion.

According to still another aspect of the present invention, there is provided an electromagnetic objective lens driving apparatus in an optical disc data recording and reproducing apparatus, including a carriage which is movable in a radial direction of the optical disc and, an objective lens holder which supports an objective lens in a manner such that laser beams are converged onto the optical disc. A yoke member is provided with permanent magnets which constitute electromagnetic drive circuits for moving the objective lens holder in the tracking and focusing directions, and a supporting block is secured to the objective lens holder. An elastic support, which connects the objective lens holder and the supporting block and which supports the objective lens holder so as to move in the focusing and tracking directions of the optical disc by force of the elastic support is also provided.

In this arrangement, preferably, the elastic support includes four suspension wires. The objective lens holder is provided with a cylindrical holder portion which holds the objective lens, and a pair of symmetrical wings which project radially from the cylindrical holder portion in the tracking direction.

Preferably, the four suspension wires are connected to upper and lower ends of each wing in a parallel arrangement.

The present disclosure relates to subject matter contained in Japanese patent application Nos. HEI 4-201044 and HEI 4-201046 (both filed on Jul. 28, 1992) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 9:
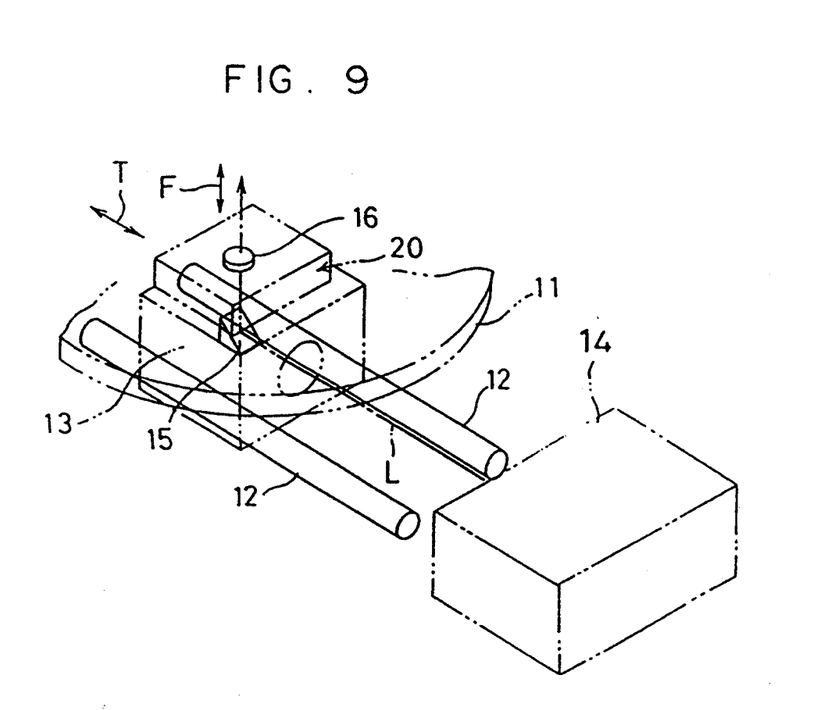
FIG. 9 is an isometric view of main components of an optical data recording and reproducing apparatus to which the present invention is applied.

As shown in FIG. 9, a pair of guide rails 12 are provided below an optical disc 11 which can be rotated. The rails 12 extend in the radial direction of the optical disc 11. A carriage 13 is supported on the guide rails 12 to move along the same. Carriage 13 is provided thereon with a prism 15 which reflects the laser beams L incident thereon from an immovable optical system 14. Prism 15 reflects the laser beams L upwardly in the vertical direction. Carriage 13 is further provided with an objective lens 16 which converges the laser beams reflected by the prism 15 onto the recording surface of the optical disc 11, and an electromagnetic driving mechanism 20 which drives the objective lens 16 in the focusing and tracking directions F and T, respectively.

The present invention is mainly directed to the electromagnetic driving mechanism 20, and in particular, to an objective lens holder 21 which holds objective lens 16 as well as an elastic supporting mechanism thereof.

As shown in FIGS. 1 through 5, lens holder 21 is provided on the center portion thereof with a cylindrical holder portion 21a and a pair of wings 21b which diametrically project from the cylindrical holder portion 21a in the radial directions and which are symmetrical to one another. Namely, the wings 21b are aligned on and along an axis passing through the center of the cylindrical holder portion 21a. The axis corresponds to the tracking direction T. Wings 21b are provided thereon with coil receiving holes 21c in which focusing coils 33 are inserted and secured.

Focusing coils 33 lie in a plane in which wings 21b lie. Focusing coils 33 are provided with linear portions 33L extending parallel with the tracking direction T.

Cylindrical holder portion 21a is provided on the outer surface thereof with two pairs of coil supporting projections 21d and 21e which project from both sides of cylindrical holder portion 21a in diametrically opposed directions perpendicular to the tracking direction T. Upper coil supporting projections 21d are fitted in the center openings of the corresponding tracking coils 34. Lower coil supporting projections 21e support the lower surfaces of tracking coils 34 located thereon. Tracking coils 34 lie in respective planes parallel with the plane of focusing coils 33 and are provided with linear coil portions 34L extending in the focusing direction F.

Objective lens holder 21 is a plastic molded structure in the illustrated embodiment. Objective lens holder 21 is provided thereon with a printed circuit to electrically interconnect focusing coils 33 and tracking coils 34 in series, and to supply focusing coils 33 and tracking coils 34 with electrical current. The printed circuit pattern is shown by hatched portions in FIGS. 3 through 5. Cylindrical holder portion 21a is provided on the outer surface thereof with a first connecting portion 26a which surrounds one of the upper coil supporting projections 21d to connect focusing coils 33, and a second connecting portion 26b which is formed on the bottom of cylindrical holder portion 21a to connect tracking coils 34. Wings 21b are provided with current supply portions 26c which supply electrical power to focusing coils 33 and power supply portions 26d which supply electrical power to tracking coils 34. The current supply portions 26c and power supply portions 26d extend to suspension wire connecting holes 27a and 27b formed on the upper and lower ends of the wings 21b, respectively.

Terminal ends 33a (FIG. 1) of the pair of focusing coils 33 are soldered to the ends of the first connecting portions 26a. The other terminal ends 33b of focusing coils 33 are soldered to the corresponding current supply portions 26c. Similarly, terminal ends 34a of the pair of tracking coils 34 are soldered to the ends of the second connecting portions 26b, and the other terminal ends (not shown) thereof are soldered to the corresponding power supply portions 26d, respectively.

Figure 1:
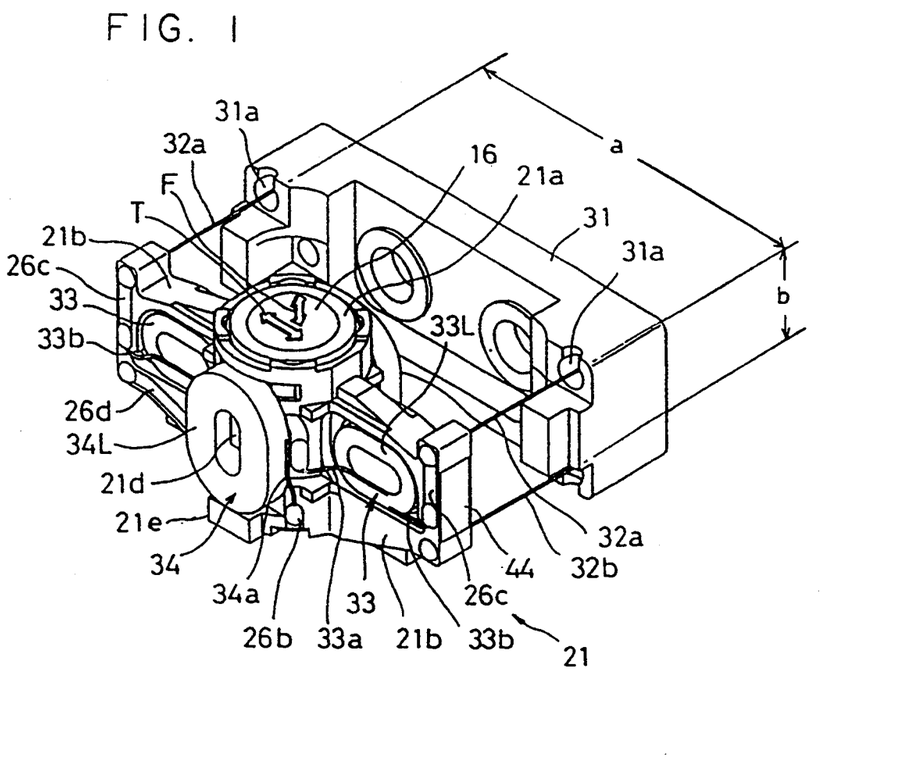
FIG. 1 is an isometric view of main components of an electromagnetic objective lens driving apparatus in an optical data recording and reproducing apparatus, according to the present invention.
Figure 2:
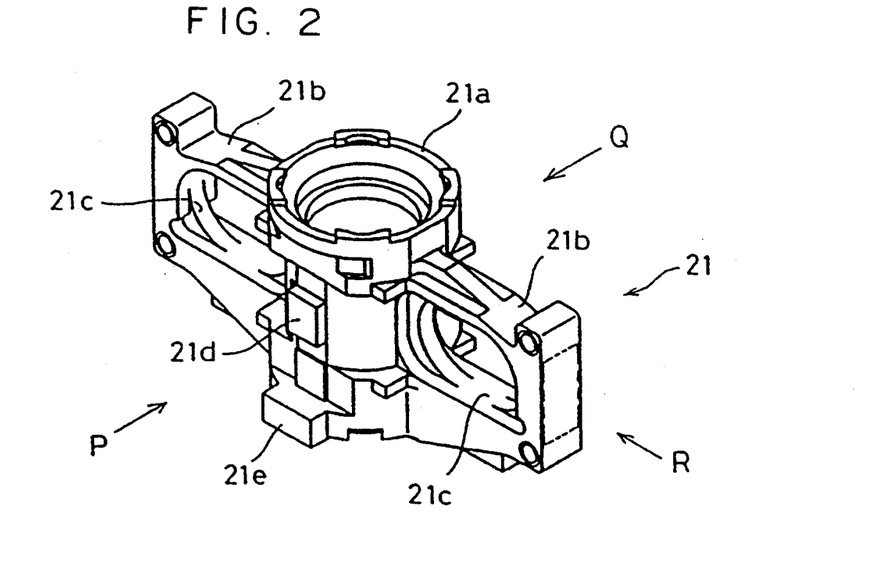
FIG. 2 is an isometric view of an objective lens holder according to the present invention.
Figure 3:
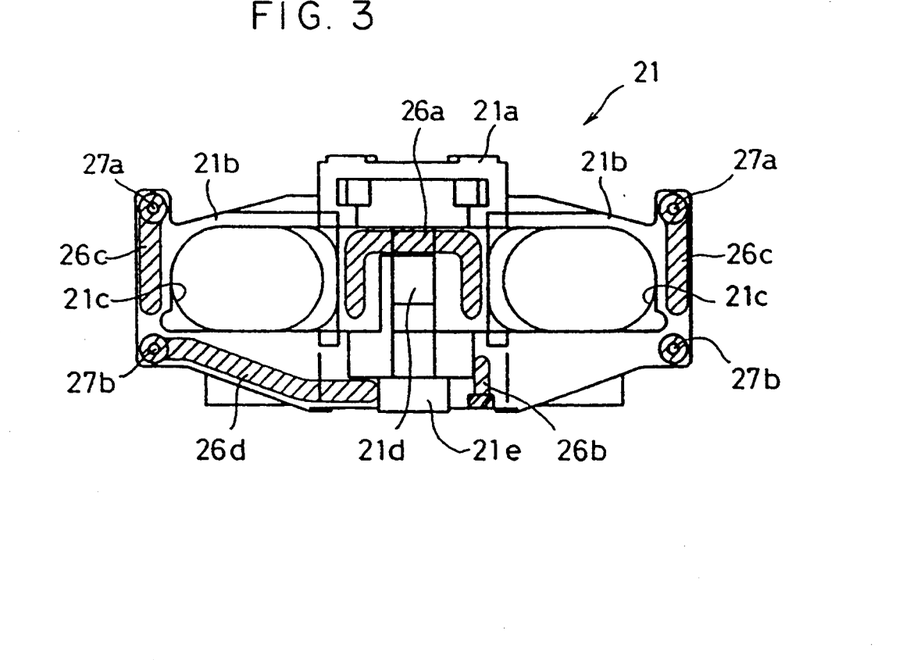
FIG. 3 is an end view of an objective lens holder, viewed from the direction P shown in FIG. 2.
Figure 4:
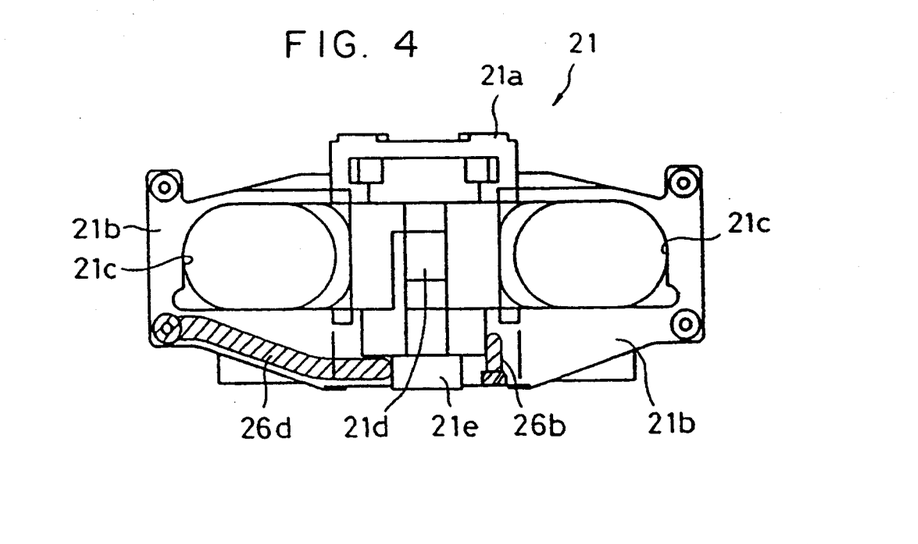
FIG. 4 is an end view of an objective lens holder, viewed from the direction Q shown in FIG. 2.
Figure 5:
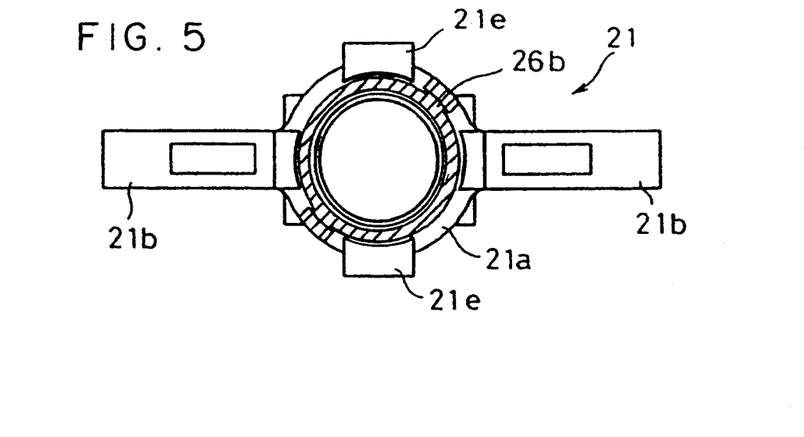
FIG. 5 is a bottom view of an objective lens holder, shown in FIG. 2.
Figure 6:
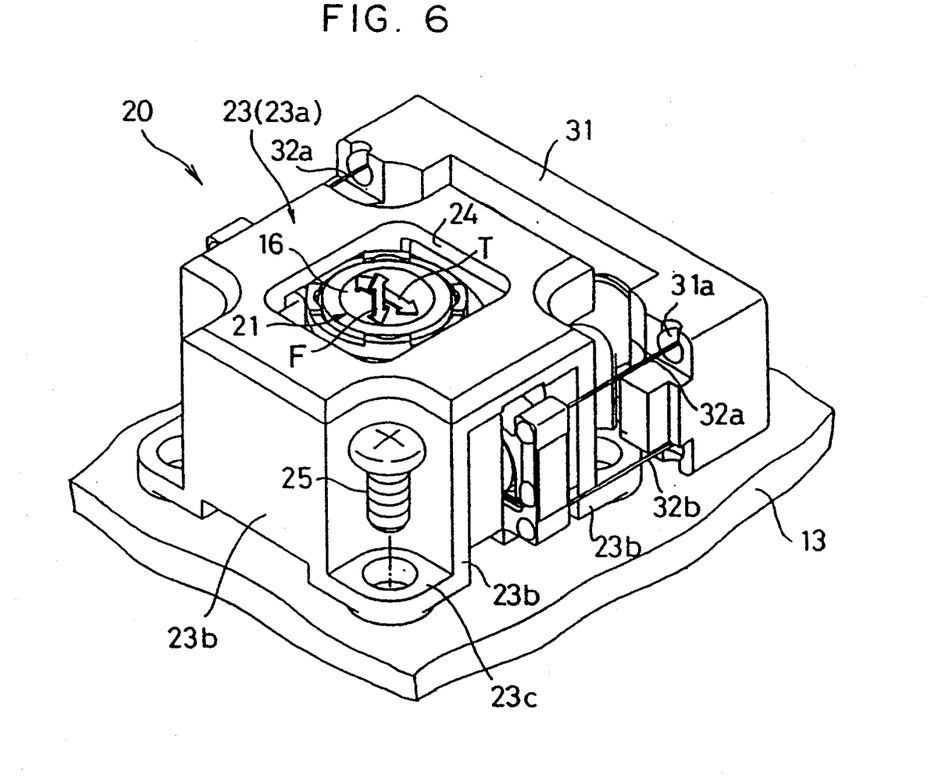
FIG. 6 is an isometric view of main components of an electromagnetic objective lens driving apparatus of an optical disc data recording and reproducing apparatus, according to another aspect of the present invention.

Suspension wires 32a and 32b are inserted in, and soldered at one end thereof, to the corresponding suspension wire connecting holes 27a and 27b. A pair of suspension wires 32a constitute a power supply line for the pair of focusing coils 33 connected in series, and a pair of suspension wires 32b constitute a power supply line for the pair of tracking coils 34 connected in series, respectively.

If objective lens holder 21 is made by plastic molding, printed circuit elements 26a through 26e of objective lens holder 21 can be directly formed on the objective lens holder 21 by the MID (Molded Interconnection Device) process.

The MID process can be applied, for example, to print an image or picture onto a three-dimensional shape by the use of pad printing, printing, an optical plotter (drawing), a mechanical plotter (drawing), or micro-sand blasting, etc.

Figure 13:
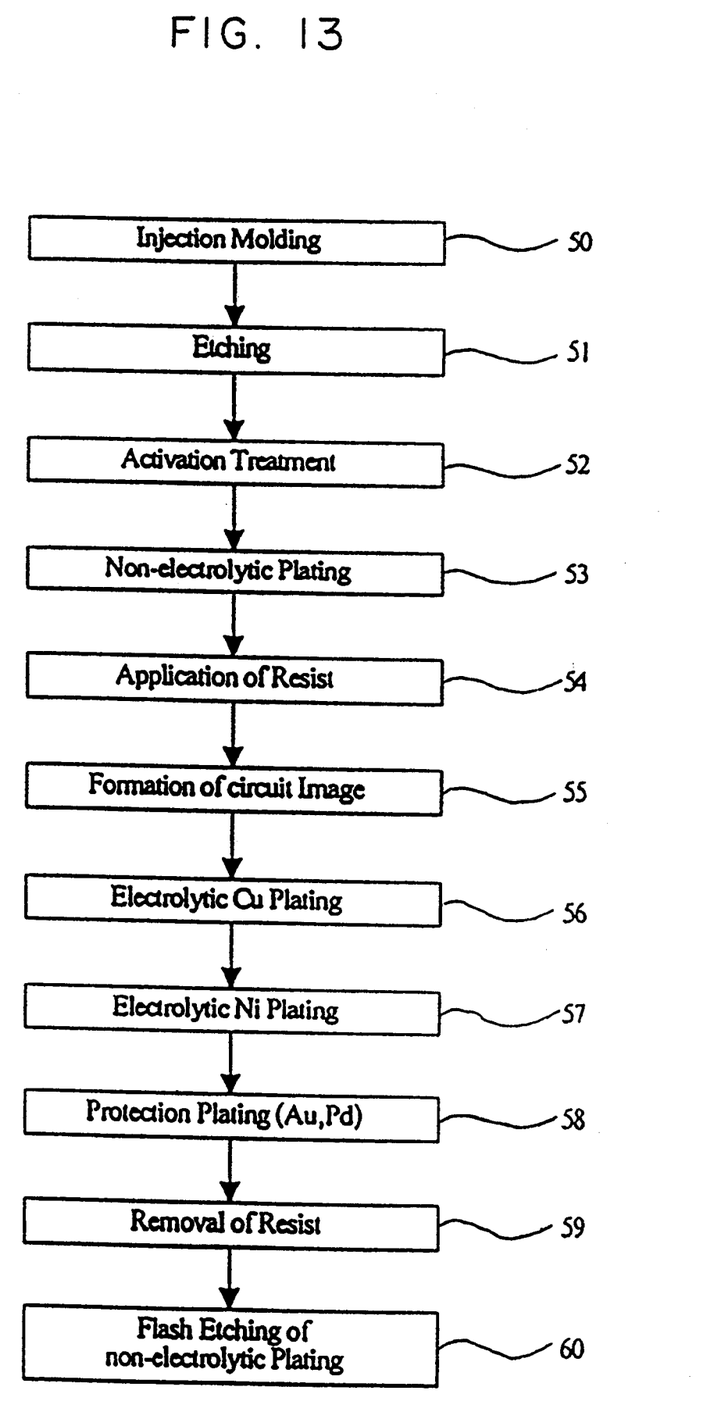

FIG. 13 shows an optical plotting process using the MID by way of example.

First, objective lens holder 21, supporting block 31, and sensor holder 41 are formed by an injection molding process 50. Thereafter, the molds thus obtained are subject to an etching process 51, an activation treatment 52, and are then uniformly plated by a non-electrolysis plating process. Thereafter, the plated molds are coated with a photo-etching resist layer by a resist applying process 54. After that, a predetermined circuit pattern image is formed by a optical circuit imaging process 55. The circuit pattern image is subject to an electrolytic copper plating process 56, an electrolytic nickel plating process 57, and a protection plating process 58, so that the image is actualized as a circuit pattern. Thereafter, the unnecessary residual resist layer is removed by a resist removal process 59, the molds are then finished by being subject to a flash etching 60 of the non-electrolysis plating.

Figure 10:
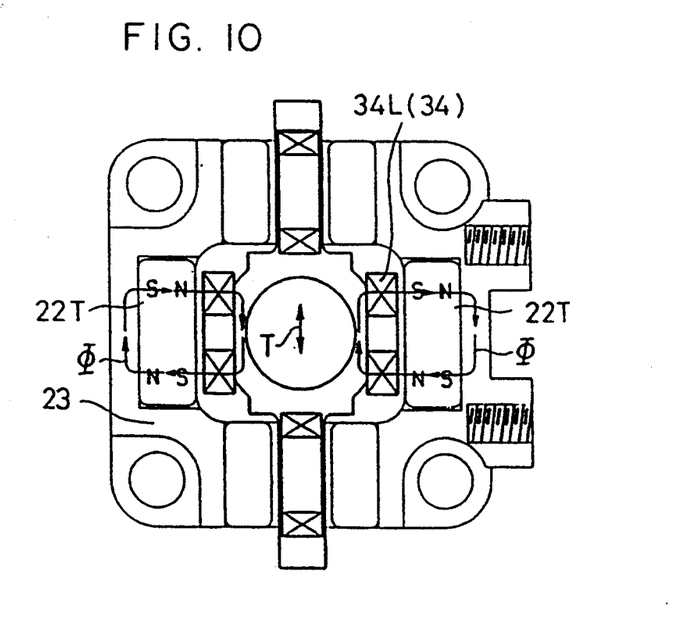
FIG. 10 is a plan view of a magnetic circuit of tracking permanent magnets which constitute an electromagnetic driving circuit, according to the present invention.
Figure 11:
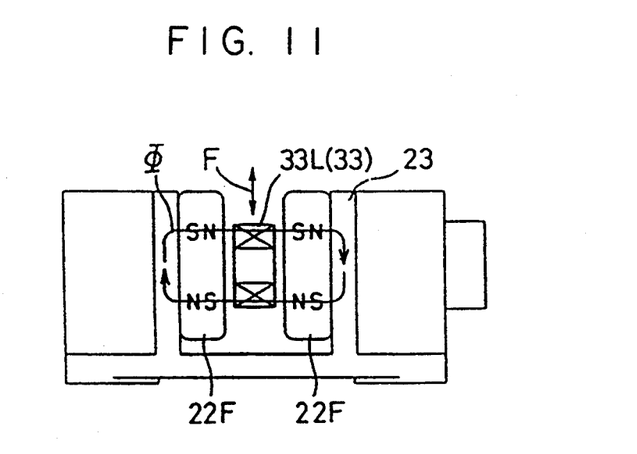
FIG. 11 is a plan view of a magnetic circuit of focusing permanent magnets which constitute an electromagnetic driving circuit, according to the present invention.
Figure 12:
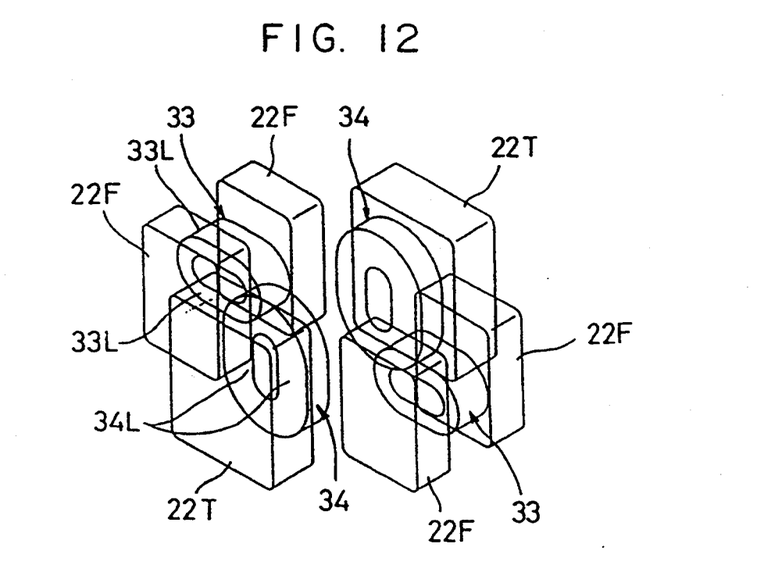
FIG. 12 is an isometric view of an arrangement of focusing and tracking coils and permanent magnets of an electromagnetic circuit, according to the present invention; and, FIG. 13 is a block diagram of a printed circuit formation on an objective lens holder using a molded interconnection device (MID) process, according to the present invention.

The magnetic circuit which constitutes an electromagnetic driving circuit together with focusing coils 33 and tracking coils 34 is provided on carriage 13. The magnetic circuit includes two pairs of focusing permanent magnets 22F, a pair of tracking permanent magnets 22T, and a yoke member 23 made of a magnetic material. The two focusing permanent magnets 22F of each pair are located on opposite sides of each focusing coil 33 of each wing 21b. The two tracking permanent magnets 22T are located on opposite sides of cylindrical holder portions 21a, so that a pair of tracking coils 34 are placed between tracking permanent magnets 22T. The arrangement of the focusing and tracking permanent magnets 22F and 22T and the polarities thereof are shown in FIGS. 10 through 12. The polarities of the focusing and tracking permanent magnets 22F and 22T are such that linear coil portions 33L and 34L of focusing coils 33 and tracking coils 34 are perpendicular to the magnetic flux Φ produced by focusing permanent magnets 22F and tracking permanent magnets 22T. Consequently, the driving force in the focusing direction F (i.e., up and down directions) is produced in objective lens holder 21 in accordance with the electric current flowing in linear coil portions 33L in the forward direction or reverse direction. Similarly, the driving force in the tracking direction T (i.e., forward and reverse directions) is produced in objective lens holder 21 in accordance with the electric current flowing in linear coil portions 34L.

The focusing (i.e., focus controlling) electromagnetic circuit formed by focusing coils 33 and focusing permanent magnets 22F is arranged so as not to interfere with the tracking (i.e., tracking controlling) electromagnetic circuit formed by tracking coils 34 and tracking permanent magnets 22T. Consequently, no driving force in the tracking direction T is produced in objective lens holder 21 by the electric current flowing in focusing coils 34, and no driving force in the focusing direction F is produced in objective lens holder 21 by the electric current flowing in tracking coils 34.

The absence of interference between the focusing and tracking electromagnetic driving circuits is a result of the arrangement in which focusing coils 33 are supported by wings 21b projecting from cylindrical holder portion 21a of objective lens holder 21, and tracking coils 34 are directly provided on the outer surface of cylindrical holder portion 21a. Consequently, precise and independent tracking and focusing control can be achieved.

Figure 7:
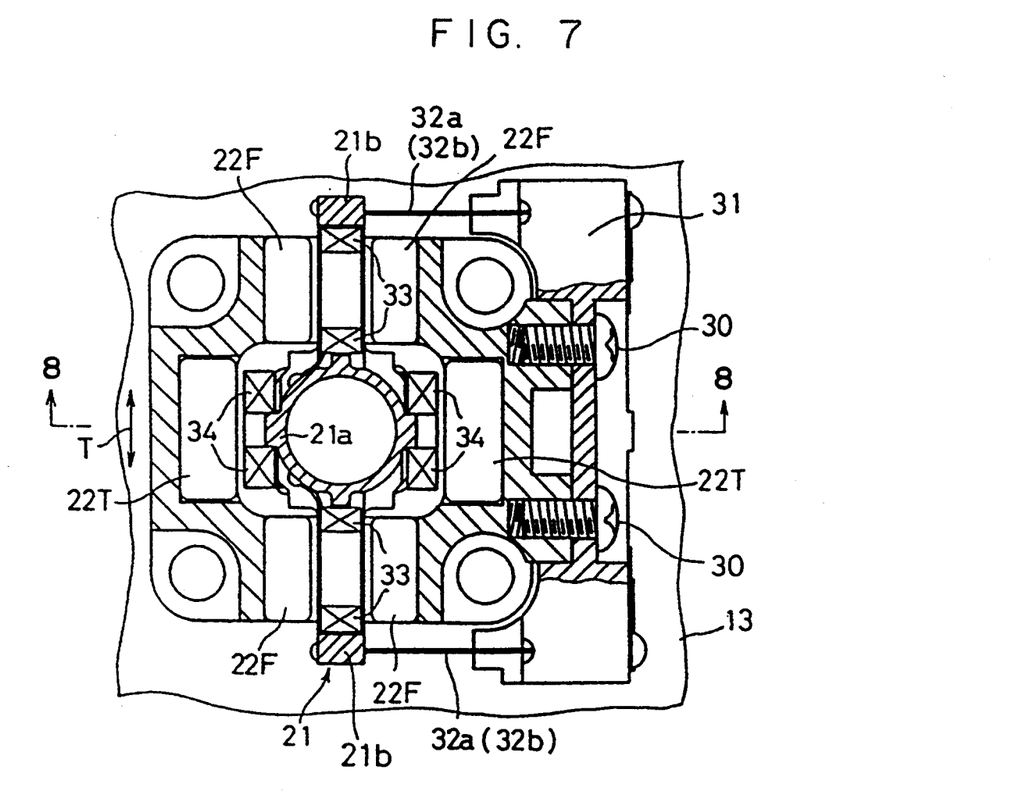
FIG. 7 is a sectional view along the line A—A in FIG. 8.
Figure 8:
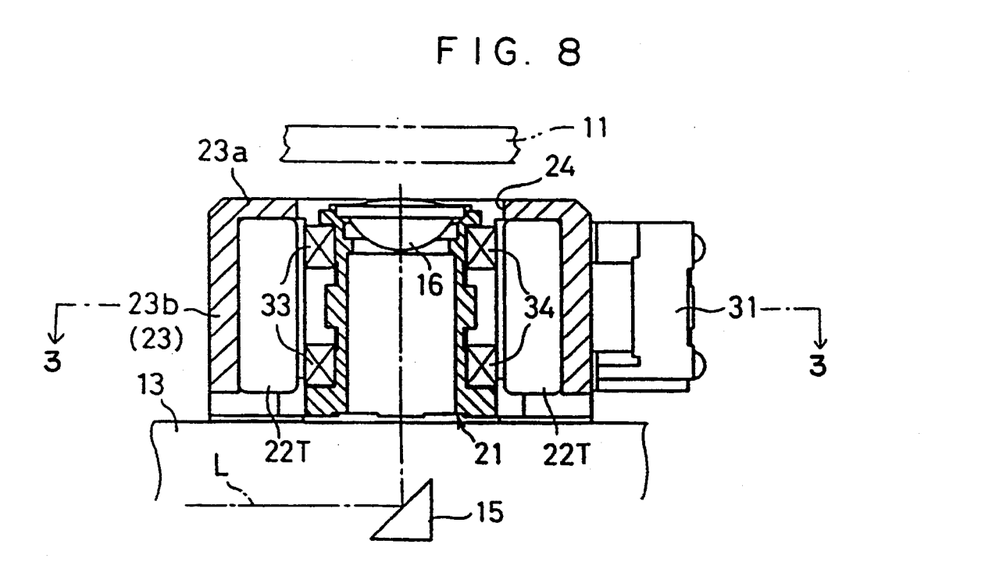
FIG. 8 is a sectional view along the line B—B in FIG. 7.

Yoke member 23 which supports focusing permanent magnets 22F and tracking permanent magnets 22T includes a magnetic shield wall 23a opposed to the optical disc 11 in parallel therewith, a plurality of yoke walls 23b projecting perpendicularly from the peripheral edge of magnetic shield wall 23a towards carriage 13, and a plurality of mounting flanges 23c which extend from yoke walls 23b and lie on carriage 13. Magnetic shield wall 23a, yoke walls 23b, and mounting flanges 23c are an integral structure. Magnetic shield wall 23a is provided with a laser transmission hole 24 in which objective lens 16 is movable, so that the laser beams L pass through laser transmission hole 24. Mounting flanges 23c are secured to carriage 13 by mounting screws 25. Supporting block 31 is secured to yoke member 23 by mounting screws 30 (FIG. 7).

The distal ends of suspension wires 32a and 32b with respect to the objective lens holder 21 (i.e., right ends in FIG. 7) are secured to supporting block 31. Objective lens holder 21, and accordingly, objective lens 16 are movable in the focusing direction F and the tracking direction T by the elasticity of suspension wires 32a and 32b. Suspension wire receiving holes 31a of supporting block 31 have a diameter sufficiently larger than the diameter of suspension wires 32a and 32b, so that the spaces between suspension wire receiving holes 31a and the associated suspension wires 32a and 32b are preferably filled with an appropriate damper (e.g., gel, etc.) to damp the oscillation of suspension wires 32a and 32b.

The distance "a" (FIG. 1) between suspension wires 32a (or 32b) in the tracking direction T is set to be substantially larger than the distance "b" (FIG. 1) between suspension wires 32a and 32b. The inclination of the optical axis of the objective lens 16, during the electromagnetic driving operation of objective lens holder 21, should be as slight as possible. According to the inventors' analysis, no inclination of the optical axis tends to occur as the value of $(a^2+b^2)/4$ is large, provided that other requirements (factors) are identical. In the illustrated embodiment, the length in the focusing direction F is reduced to result in a thin objective lens holder. Namely, "b" is smaller than "a" (a>b).

In electromagnetic driving mechanism 20, as constructed above, a driving current for the focusing operation is supplied to focusing coils 33 through suspension wires 32a, and the driving current for the tracking is supplied to tracking coils 34 through suspension wires 32b, respectively. When the driving current for the focusing is supplied to focusing coils 33, objective lens holder 21 and, accordingly, objective lens 16 are electromagnetically driven in the focusing direction F in accordance with the direction and intensity of the driving current supplied thereto. Similarly, when the driving current for the tracking is supplied to tracking coils 34, objective lens holder 21 and, accordingly, objective lens 16 are electromagnetically driven in the tracking direction T in accordance with the direction and intensity of the driving current supplied thereto. Thus, laser beams L are accurately converged onto a predetermined recording track of optical disc 11 by objective lens 16 in accordance with the control of the driving current to be supplied to focusing coils 33 or tracking coils 34.

Since the printed circuit, including circuit elements 26a (i.e., first connecting portion) through 26e (i.e., power supply portions 26d), is directly formed on the outer surface of objective lens holder 21, in the illustrated embodiment, it is not necessary to provide a separate printed circuit board or sheet. Thus, the electrical connection between the tracking and focusing coils and the power supply thereto can be easily established by a simple wiring arrangement without increasing the weight of the apparatus.

Nevertheless, in the present invention, whose subject is mainly directed to the shape of objective lens holder 21 and the supporting mechanism of focusing and tracking coils 33 and 34 thereof, the connection of the focusing and tracking coils and the power supply thereto may be realized by other means.

As can be understood from the above discussion, according to the present invention, the objective lens holder, which is movable on the carriage, is provided with a cylindrical portion which supports the objective lens, and a pair of wing portions projecting in the radial directions from the cylindrical portion in the tracking direction of the optical disc in a symmetrical arrangement. The focusing coils are secured to the wing portions, and the tracking coils are supported on the diametrically opposed outer surface portions of the cylindrical portion perpendicular to the tracking direction. Accordingly, a small and light objective lens holder (i.e., movable device) on the carriage is obtained in which precise track access can be performed owing to the reduced weight of the movable device.

If the wing portions are provided with the coil receiving through holes, the objective lens holder is to be lighter.

Furthermore, according to the present invention, the focusing and tracking electromagnetic driving circuits can be electromagnetically independent so that precise control can be effected.

Moreover, according to the present invention, since the four suspension wires, which elastically support the small and light movable device (i.e., objective lens holder), are connected at one end thereof to the corresponding suspension wire connecting holes formed at the upper and lower ends of the wing portions of the objective lens holder, there is substantially no projection or obstacle in the focusing direction. Namely, the supporting mechanism is substantially flat in the focusing direction. Consequently, the distance "a" between the suspension wires in the tracking direction can be larger than the distance "b" between the suspension wires in the focusing direction. Accordingly, the supporting mechanism can be thin while effectively restricting the deviation or inclination of the optical axis of the objective lens during the electromagnetic driving thereof at high acceleration.

Furthermore, the printed circuit for connecting the connecting holes of the suspension wires and the tracking and focusing coils on the objective lens holder contributes to a realization of a small and light electrical wiring device and movable member including the objective lens holder.

I claim:

1. An electromagnetic objective lens driving apparatus of an optical disc data recording and reproducing apparatus, comprising:

a carriage that is moveable in a radial direction of the optical disc;

an objective lens holder that supports an objective lens in a manner such that laser beams are converged onto the optical disc, said objective lens holder being supported on the carriage and movable in focusing and tracking directions of the optical disc, said objective lens holder being provided with a cylindrical holder portion, which holds the objective lens, and a pair of symmetrical wings having holes therein, said wings project radially from the said cylindrical holder portion in the tracking direction and have a predetermined thickness;

focusing coils secured within said holes of said respective wings, an outer surface of said focusing coils contacting an inner surface of said holes, a thickness of said focusing coils corresponding to said predetermined thickness of said wings, whereby said focusing coils are substantially contained within said holes; and tracking coils secured to diametrically opposed outer surface portions of the cylindrical holder portion perpendicular to the tracking direction.

2. The electromagnetic objective lens driving apparatus of claim 1, wherein said carriage comprises two pairs of focusing permanent magnets provided on opposite sides of the respective focusing coils secured to the wings of the objective lens holder, and a pair of tracking permanent magnets provided on opposite sides of the tracking coils secured to the outer surface portions of the cylindrical holder portion.

3. The electromagnetic objective lens driving apparatus of claim 2, wherein said focusing permanent magnets, together with said focusing coils, constitute a focusing electromagnetic driving circuit, and said tracking permanent magnets, together with the tracking coils, constitute a tracking electromagnetic circuit.

4. The electromagnetic objective lens driving apparatus of claim 3, wherein said focusing electromagnetic driving circuit and said tracking electromagnetic driving circuit are electromagnetically independent.

5. The electromagnetic objective lens driving apparatus of claim 1, further comprising suspension wires for elastically supporting the objective lens holder.

6. The electromagnetic objective lens driving apparatus of claim 5, wherein four suspension wires are provided.

7. The electromagnetic objective lens driving apparatus of claim 6, further comprising an immovable supporting block provided on the carriage.

8. The electromagnetic objective lens driving apparatus of claim 7, wherein both ends of said wings of the objective lens holder are provided with upper and lower suspension wires connecting holes spaced in the focusing direction, so that the four suspension wires are connected at one end thereof to the suspension wire connecting holes, and at the other ends to the supporting block.

9. The electromagnetic objective lens driving apparatus of claim 8, wherein the distance between the suspension wires in the tracking direction is larger than the distance between the suspension wires in the focusing direction.

10. The electromagnetic objective lens driving apparatus of claim 9, wherein said objective lens holder is formed by a plastic injection mold.

11. The electromagnetic objective lens driving apparatus of claim 10, further comprising a printed circuit provided on the objective lens holder to electrically connect the suspension wire connecting holes and the focusing and tracking coils, respectively.

12. The electromagnetic objective lens driving apparatus according to claim 1, further comprising a plurality of suspension wires for elastically supporting said objective lens holder for movement with respect to said carriage, said wires being connected to said objective lens holder at outermost portions of said wings to which the focusing coils are secured.

13. An electromagnetic objective lens driving apparatus of an optical disc data recording and reproducing apparatus, comprising;
an objective lens which converges laser beams onto the optical disc; and
an objective lens holder provided with a cylindrical holder portion that holds the objective lens, and a pair of symmetrical wings having holes therein, said wings project radially from the cylindrical holder portion in the tracking direction and have a predetermined thickness;
focusing coils secured to the respective wings, an outer surface of said focusing coils contacting an inner surface of said holes, a thickness of said focusing coils corresponding to said predetermined thickness of said wings, whereby said focusing coils are substantially contained within said holes; and
tracking coils secured to diametrically opposed outer surface portions of the cylindrical holder portion perpendicular to the tracking direction.

14. The electromagnetic objective lens driving apparatus of claim 13, further comprising a yoke member provided on a carriage supporting said objective lens holder.

15. The electromagnetic objective lens driving apparatus of claim 14, wherein said carriage comprises two pairs of focusing permanent magnets provided on opposite sides of the respective focusing coils secured to the wings of the objective lens holder, and a pair of tracking permanent magnets provided on opposite sides of the tracking coils secured to the outer surface portions of the cylindrical holder portion.

16. The electromagnetic objective lens driving apparatus of an apparatus according to claim 13, further comprising a plurality of suspension wires for elastically supporting said objective lens holder for movement with respect to a carriage, said wires being connected to said objective lens holder at outermost portions of said wings to which said focusing coils are secured.

17. The electromagnetic objective lens driving apparatus according to claim 13, corresponding end faces of said tracking and focusing coils extending in substantially parallel planes.

18. An electromagnetic objective lens driving apparatus of an optical disc data recording and reproducing apparatus, comprising;
a carriage which is moveable in a radial direction of the optical disc;
and objective lens holder which supports an objective lens in a manner such that laser beams are converged onto the optical disc;
a yoke member provided on the carriage and provided with permanent magnets which constitute electromagnetic driving circuits for moving the objective lens holder in the tracking and focusing directions;
a supporting block secured to the objective lens holder;
an elastic support which connects the objective lens holder and the supporting block, and which supports the objective lens holder so as to move for movement in the focusing and tracking directions of the optical disc by a force of the elastic support; and
said objective lens holder provided with a cylindrical holder portion that holds the objective lens and a pair of symmetrical wings having holes therein, said wings project radially from the cylindrical holder portion in the tracking direction and have a predetermined thickness, focusing coils secured to the respective wings, an outer surface of said focusing coils contacting an inner surface of said holes, a thickness of said focusing coils corresponding to said predetermined thickness of said wings, whereby said focusing coils are substantially contained within said holes, and tracking coils secured to diametrically opposed outer surface portions of the cylindrical holder portion perpendicular to the tracking direction.

19. The electromagnetic objective lens driving apparatus of claim 18, wherein said elastic support comprises four suspension wires.

20. The electromagnetic objective lens driving apparatus of claim 19, wherein said four suspension wires are connected to upper and lower ends of each wing in a parallel arrangement.

21. The electromagnetic objective lens driving apparatus according claim 18, further comprising a plurality of suspension wires for elastically supporting said objective lens holder for movement with respect to said carriage, said wires being connected at outermost portions of said wings to which said focusing coils are secured.

* * * * *